United States Patent [19]

Pfleiderer et al.

[11] Patent Number: 4,496,980

[45] Date of Patent: Jan. 29, 1985

[54] TWO-DIMENSIONAL SEMICONDUCTOR IMAGE SENSOR WITH REGULATED INTEGRATION TIME

[75] Inventors: Hans-Joerg Pfleiderer, Zorneding; Heiner Herbst, Munich, both of Fed. Rep. of Germany

[73] Assignee: Siemens Aktiengesellschaft, Berlin & Munich, Fed. Rep. of Germany

[21] Appl. No.: 409,629

[22] Filed: Aug. 19, 1982

[30] Foreign Application Priority Data

Sep. 25, 1981 [DE] Fed. Rep. of Germany ....... 3138294

[51] Int. Cl.³ .............................................. H04N 3/12
[52] U.S. Cl. .................................... 358/212; 358/213; 358/167
[58] Field of Search ......................... 358/213, 212, 167

[56] References Cited

U.S. PATENT DOCUMENTS

| | | | |
|---|---|---|---|
| 4,189,749 | 2/1980 | Hiroshima et al. | 358/167 |
| 4,233,632 | 11/1980 | Akiyama | 358/212 |
| 4,242,700 | 12/1980 | Weimer | 358/44 |
| 4,380,755 | 4/1983 | Endlicher et al. | 382/68 |
| 4,413,283 | 11/1983 | Aoki et al. | 358/213 |

Primary Examiner—Gene Z. Rubinson
Assistant Examiner—Robert Lev
Attorney, Agent, or Firm—Hill, Van Santen, Steadman & Simpson

[57] ABSTRACT

A two-dimensional image sensor integrated on a semiconductor substrate has a plurality of sensor elements disposed in rows and columns. The sensors in each row and column are individually selected in succession via parallel outputs of a vertical shift register for readout of the sensor elements. Regulation of the integration time during which charge carriers collect in the sensor elements due to incident light is achieved by selecting the sensor elements in each even-numbered row for readout a further number of times after an initial readout of the charges optically generated therein, and within the time span during which transfer of the charges from the sensor elements of the next odd-numbered rows to the column lines takes place. The further selections eliminate charges formed in the interim in a particular row. The next readout of the particular row is undertaken with an integration time for the sensor elements therein which is variably shortened by the duration of the readout for $(2N-1)$ rows, where N is the number of even or odd numbered rows.

17 Claims, 5 Drawing Figures

FIG 2

TWO-DIMENSIONAL SEMICONDUCTOR IMAGE SENSOR WITH REGULATED INTEGRATION TIME

BACKGROUND OF THE INVENTION

1. Field of the Invention

The present invention relates to two-dimensional semiconductor image sensors, and in particular to such an image sensor with controlled or regulated integration time. Related Application The subject matter of this application is related to the subject matter of the co-pending application of R. Koch and H. Herbst entitled "Two-Dimensional Semiconductor Image Sensor With Regulated Integration Time" filed simultaneously herewith and identified with Ser. No. 409,628 filed Aug. 19, 1982.

2. Description of the Prior Art

A two-dimensional semiconductor image sensor with a number of sensor elements disposed in rows and columns on a semiconductor substrate is described, for example, in the article "Low-Noise MOS Area Sensor with Antiblooming Photodiodes," Ohba et al, IEEE Journal of Solid-State Circuits, Vol. SC-15, No. 4, August 1980 at pages 747 through 752. In the image sensor described therein, all lines are controllable by means of allocated parallel outputs of a vertical shift register for selecting the individual sensor elements. The outputs of the sensor elements are connected in the selected state to the column lines and a sensor output is provided for a sequential readout of the signals of the sensor elements transmitted in parallel on the column lines which correspond to the amount of optically-generated charge carriers resulting from light incident on the sensors.

A disadvantage of such conventional image sensors is that the integration time, which is the time during which the sensors are connected to an operating voltage so that charge carriers can be generated within the sensors, is fixed and cannot be changed in order to adapt to different uses of the image sensor and different types of incident light to which the sensors may be exposed.

SUMMARY OF THE INVENTION

It is an object of the present invention to provide a two-dimensional semiconductor image sensor which permits control or regulation of the integration time of the image sensor.

It is a further object of the present invention to provide such an image sensor wherein the integration time is controllable in small steps over a large control range, so that very precise regulation of the output signals of the image sensor can be attained.

The above objects are inventively achieved in an image sensor which has a plurality of sensor elements disposed in rows and columns on a semiconductor substrate with all sensors in each column being connected to respective row lines which are in turn connected to the outputs of a vertical shift register, and all sensors in each column being respectively connected to column lines which are in turn connected to the outputs of a horizontal shift register. The vertical and horizontal shift registers control readout of the sensor elements by permitting transfer of the charge carriers generated in the sensor elements in the rows and columns to be transferred to subsequent processing and evaluating means for developing a final output signal.

The sensor elements are periodically connected to a supply or operating voltage, during which time optically-generated charge carriers are collected in the sensor elements corresponding to the light incident thereon. The time span during which such charge carriers are generated within the sensor elements is defined as the integration time. The integration time for the sensor elements in the device disclosed herein is controlled by a plurality of first row selection transistors respectively connected to each of the row lines and also connected to a constant voltage source, each of the first row selection transistors having respective control terminals which are connected via a plurality of second row selection transistors to the parallel outputs of the vertical shift register. The second row selection transistors are selectable in such a manner that the first row selection transistors of all odd-numbered rows are connected at their control terminals to the allocated parallel outputs of the vertical shift register in an alternating sequence with the first row selection transistors of all of the even-numbered rows. All of the column lines are simultaneously connected to a constant voltage. This permits all of the sensor elements in the even-numbered and odd-numbered rows to be selected and read out a further N times (N being the number of even or odd numbered rows of sensor elements) for eliminating charges which are optically generated in the sensor elements in the interim after an initial readout. After the initial readout of a particular row, the integration time for the sensor elements in that row is shortened by the duration for the readout of the remaining $(2N-1)$ rows, and may therefore be varied to adapt to differing environments.

Although the image sensor disclosed and claimed herein has application in any number of optoelectronic devices, the image sensor has particular utility in electronic cameras which may be employed for generating images which are subsequently transferred to a video recorder or displayed on a video screen such as a television.

DESCRIPTION OF THE PREFERRED EMBODIMENTS

Figure 1:
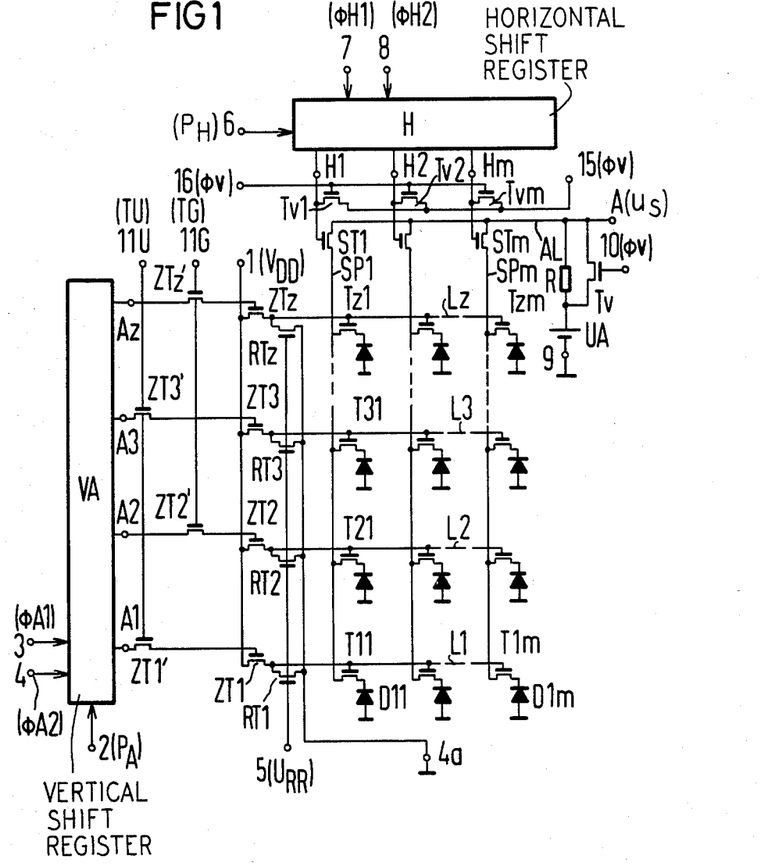
FIG. 1 is a circuit diagram for a two-dimensional semiconductor image sensor constructed in accordance with the principles of the present invention.

A monolithically integratable circuit with a two-dimensional semiconductor image sensor is shown in FIG. 1. The circuit may be integrated on a semiconductor substrate (not shown). The image sensor has a plurality of sensor elements disposed in rows and columns on the substrate. The sensor elements may be any suitable device for generating charge in response to light incident thereon such as, for example, photodiodes as shown in the embodiment of FIG. 1. The photodiodes disposed in the first row are referenced D11 through D1m. Each photodiode D11 through D1m is connected in series with the switching (source-drain) segment of selection transistors T11 through T1m, each of the selection transistors T11 through T1m having a gate connected to a common row line L1. The common row line L1 is connected via the switching segment of a row selection transistor ZT1 to a terminal 1 which is supplied with a constant voltage $V_{DD}$. The gate of the row selection transistor ZT1 is connected via the switching segment of a further row selection transistor ZT1' to a parallel output A1 of a vertical shift register VA. The vertical shift register VA has a signal input 2, to which an input signal $P_A$ is supplied, and has clock pulse inputs 3 and 4 to which clock pulses $\phi A1$ and $\phi A2$ are respectively supplied.

The row line L1 is additionally connected via the switching segment of a reset transistor RT1 to a circuit point 4a at reference potential. The gate of the reset transistor RT1 is connected to a terminal 5 which is supplied with a voltage $U_{RR}$.

The further photodiodes and selection transistors of the image sensor are allocated to row lines L2 through Lz in an analogous manner, which are connected to the terminal 1 via row selection transistors ZT2 through ZTz. The gates of the row selection transistors ZT2 through ZTz are connected to the parallel outputs A2 through Az of the vertical shift register VA via the switching segments of further row selection transistors ZT2' through ZTz'. Further reset transistors RT2 through RTz are provided which are respectively allocated to the row lines L2 through Lz as described above, each of the reset transistors RT2 through RTz having a gate connected to the terminal 5.

The selection transistors T11 through Tz1 which are associated with photodiodes disposed in a column are connected to a column line SP1 which is in turn connected via a column selection transistor ST1 to a readout line AL. The gate of the column selection transistor ST1 is connected to a parallel output H1 of a horizontal shift register H. In an analogous manner, the selection transistors up to selection transistor Tzm allocated to the additional columns are connected to further column lines up to column line SPm, and are connected to the readout line AL via further column selection transistors up to column selection transistor STm. The gates of the column selection transistors are connected to further parallel outputs up to output Hm of the horizontal shift register H. The horizontal shift register H has a signal input 6 which is supplied with a signal $P_H$, and clock pulse inputs 7 and 8 which are respectively supplied with clock pulses $\phi H1$ and $\phi H2$.

The readout line AL is connected via a resistor R and a voltage source UA connected in series thereto to a circuit point 9 at reference potential. The switching segment of a transistor Tv is connected in parallel with the resistor R, and the gate of the transistor Tv is connected to a terminal 10 which is supplied with a clock pulse voltage $\phi v$. The junction of the readout line AL and the resistor R forms the sensor output A, at which a sensor output signal $u_s$ appears.

The gates of the second row selection transistors (ZT1', ZT3', etc.) which are allocated to odd-numbered row lines (L1, L3, etc.) are connected to a common terminal 11U. The gates of the second row selection transistors (ZT2' . . . ZTz') allocated to the even-numbered row lines (L2 . . . Lz) are connected to a common terminal 11G. The gates of the column selection transistors ST1 through STm are connected via the switching segments of switching transistors Tv1 through Tvm to a terminal 15 which is supplied with a clock pulse voltage $\phi v$, and the gates of the transistors Tv1 through Tvm are connected to a common terminal 16 which is also supplied with the clock pulse voltage $\phi v$.

The shift registers VA and H may be, for example, dynamic two-phase shift registers, supplied with suitable input signals and clock pulse voltages as described above.

The terminals 11U and 11G are respectively supplied with clock pulse voltages TU and TG.

Figure 2:
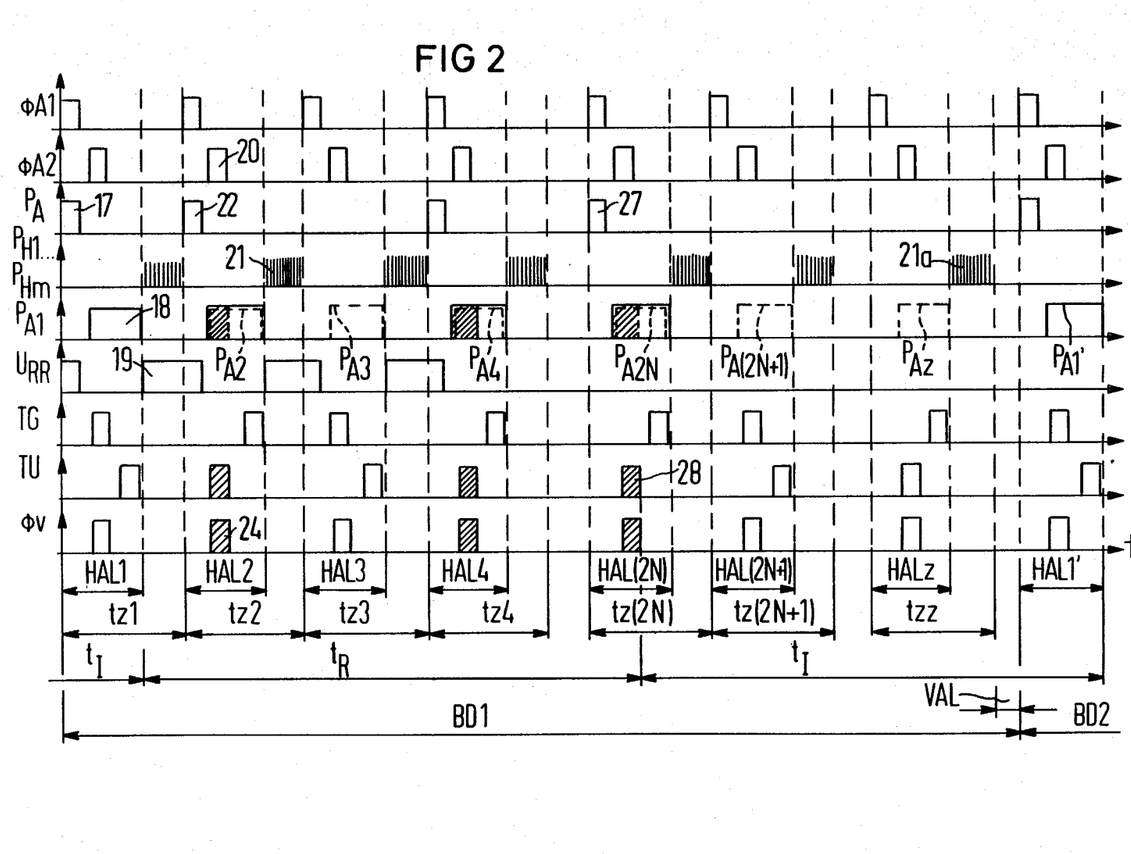
FIG. 2 is a voltage/time diagram for the voltages for operating the circuit shown in FIG. 1.

The above voltages and clock pulse voltages are illustrated with respect to time t in FIG. 2. When a voltage pulse $P_A$, such as the pulse referenced at 17 in FIG. 2 which may, for example, represent a logical "1", which coincides with a clock pulse $\phi A1$ is supplied to the signal input 2 of the shift register VA, a pulse $P_{A1}$ indicated at 18 in FIG. 2 appears at the shift register output A1 simultaneously with the next clock pulse $\phi A2$. By means of this pulse and as a result of a simultaneously occurring clock pulse TU, the row line L1 is connected through the conductively-switched transistor ZT1 to the terminal 1 which is at the potential $V_{DD}$, so that all selection transistors T11 through T1m are switched to a conducting state and the electrical charges collected in the sensor elements D11 through D1m as a result of exposure of those sensor elements to incident light are transferred to the associated respective column lines SP1 through SPm. In a following time interval the pulses $P_{H1}$ through $P_{Hm}$, which are derived from a pulse $P_H$ (a logical "1") supplied to the input 6 by means of the clock pulses $\phi H1$ and $\phi H2$, occur in rapid sequence at the parallel outputs H1 through Hm of the horizontal shift register H, so that the column selection transistors ST1 through STm are briefly individually and successively switched to a conducting state. The charges transmitted via the column lines are thus sequentially supplied over the readout line AL to the resistor R, whereby corresponding voltages occur at the output A which form the portion of the sensor output signals $u_s$ related to the row of photodiodes D11 through D1m (line L1). By means of a pulse $U_{RR}$, referenced in FIG. 2 at 19, the line L1 is subsequently set to a reference potential via the reset transistor RT1, so that the transistors T11 through T1m are again in a non-conducting state. The time span from the beginning of the clock pulse $\phi A1$ through the end of the clock pulse TU is referenced in FIG. 2 as the horizontal blanking interval HAL1. The time span from the beginning of the clock pulse $\phi A1$ to the end of the pulse $P_{Hm}$ is referenced in FIG. 2 as the row duration tz1.

With the next-successive clock pulse $\phi A2$, referenced at 20 in FIG. 2, a pulse $P_{A2}$ appears at the output A2, by means of which, in combination with a clock pulse TG, all photodiodes of the row line L2 are selected and the charge respectively connected in each of those photodiodes is transferred to the associated column lines SP1 through SPm. By means of a sequence 21 of pulses $P_{H1}$ through $P_{Hm}$, these charges are again sequentially read out, whereby another portion of the sensor signal $u_s$ occurs at the output A. This readout operation is repeated row by row until, within the row duration tzz, a pulse $P_{Az}$ and a simultaneously-occurring clock pulse TG occur at the terminal 11G and the charges of the photodiodes in the line Lz are read out at the sensor output A in the form of another portion of the sensor output signals $u_s$ by means of a sequence 21a of pulses $P_{H1}$ through $P_{Hm}$. A time interval defined as the vertical blanking interval VAL follows the row duration tzz, with the duration from the beginning of the horizontal blanking interval HAL1 to the end of the vertical blanking interval VAL defined as the image duration BD1. Within the next-successive image duration BD2, a horizontal blanking interval HAL1' first occurs, in which the next charge transfer from the photodiodes D11 through D1m to the column lines again takes place in the manner described above.

If no further readout steps were undertaken the photodiodes D11 through D1m connected to the common row line L1 would have a fixed integration time equal to the entire time span from thr beginnning of the reset pulse 19 to the end of the pulse $P_{A1'}$. In accordance with the principles of the present invention, a pulse $P_A$ representing a logical "1" and referenced at 22 in FIG. 2 and coinciding with the clock pulse $\phi A1$ is supplied to the input 2 of the vertical shift register VA during HAL2. At the next-successive clock pulse $\phi A2$, a pulse $P_{A1}$ occurs at the output A1 which, in combination with the clock pulse TU, again connects the row line L1 to the supply voltage $V_{DD}$ at the terminal 1 via the transistor ZT1. The charges which have collected in the photodiodes D11 through D1m in the interim are thus transferred to the column lines SP1 through SPm. The clock pulse $\phi v$, referenced at 24 in FIG. 2, effects a switching of the transistors Tv1 through Tvm to a conducting state so that the transistors ST1 through STm are also switched to a conducting state. The clock pulse $\phi v$ supplied to the gate of the transistor Tv also effects a bridging of the resistor R by the switching segment of the transistor Tv, so that the charges are simultaneously supplied to the sensor output A, which is now at a constant voltage UA, so that the charges are destroyed without generating corresponding output signals. This charge cancellation occurring during HAL2 as a consequence of the pulse 22, is indicated in FIG. 2 by means of shading the pulse 24 and the simultaneously-occurring pulse TU.

When a total of N pulses $P_A$ are supplied to the input 2 of the vertical shift register VA during the course of the even-numbered blanking intervals HAL2 through HAL(2N), the last of such pulses being indicated at 27 in FIG. 2, the charges optically collected in the photodiodes D11 through D1m after the beginning of the pulse 19 are again destroyed, during the respective horizontal blanking intervals HAL2 through HAL(2N). It is only after the termination of the pulse TU in the blanking interval HAL(2N) and in the following time span ($t_I$) to the end of the pulse $P_{A1'}$ that exposure-dependent charges again collect undisturbed in the photodiodes D11 through D1m. These charges are transferred upon the occurrence of the pulse $P_{A1'}$ to the column lines SP1 through SPm and are subsequently read out as part of a new sensor signal $u_s$. Thus an integration time $t_I$ from the end of the pulse TU occurring in the interval HAL(2N) which is referenced at 28 in FIG. 2 to the end of the pulse $P_{A1'}$ occurs for the photodiodes D11 through D1m. The time from the end of the pulse 18 to the end of the pulse 28 in which the charges of the photodiodes are repeatedly cancelled is defined as the reset time $t_R$.

The image sensor disclosed and claimed herein thus permits control or regulation of the integration time for the photodiodes in a row line, such as the row line L1, by the plurality N of pulses $P_A$ which occur within the time span BD1. The reset time $t_R$ becomes larger as N increases and the integration time $t_I$ becomes smaller.

Because the pulses $P_A$ move through the shift register VA by steps, the same applies to the photodiodes in the other row lines L2 through Lz, for which corresponding reset times and integration times respectively shifted by a row duration occur. The total of all of the reset times and integration times for all of the row lines equals BD1. The integration time for all sensor elements can thus theoretically be varied between zero and the image duration BD1 in steps which correspond to a doubled row duration such as, for example, $tz1+tz2$.

The number N may also be selected in order to adjust the sensor signal $u_s$ appearing at the sensor output A in order to maintain a relatively constant mean amplitude for those sensor signals, even when the image sensor is radiated by different luminous intensities E. In such a situation, the number N is selected as a function of the respective value of E. Given a total number z of even-numbered rows and a row duration tz, and leaving the vertical blanking interval out of consideration, the reset time $t_R$ is determined by the following equation:

$$t_R = (2N-1) \cdot tz$$

and the integration time $t_I$ is defined by the equation:

$$t_I = z - (2N-1) \cdot tz.$$

The mean amplitude of the output signal $u_s$ of the image sensor is proportional to E and to $t_I$ such that:

$$u_s = c_1 \cdot E \cdot t_I$$

wherein $c_1$ denotes a first constant. In order for $u_s$ to remain constant, the following condition must be satisfied:

$$t_I \cdot E = c_2$$

wherein $c_2$ denotes a second constant. Combining the above equations yields the expression:

$$2N - 1 = z - (c_3/E)$$

wherein $c_3$ denotes a third constant.

Figure 3:
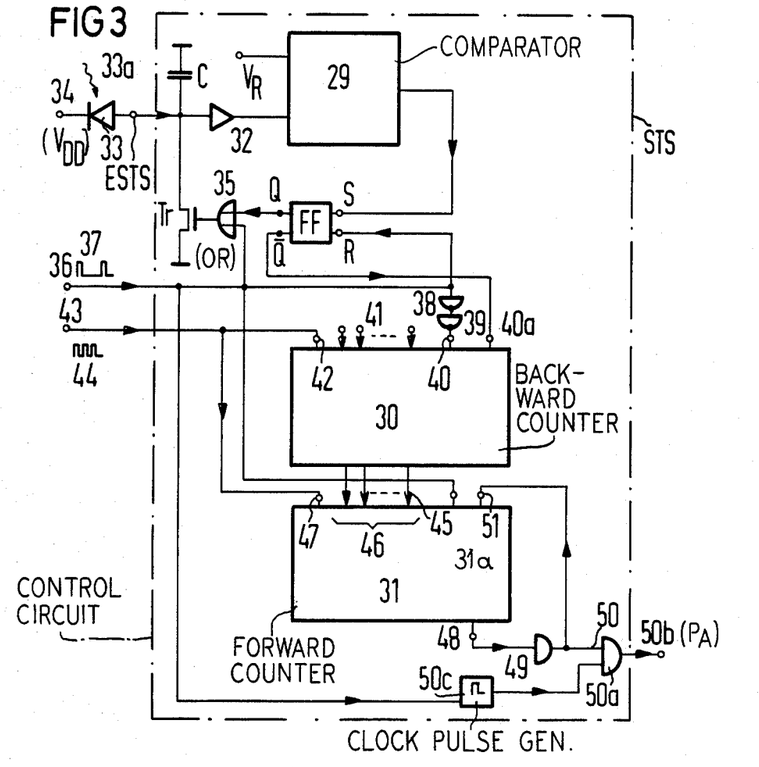
FIG. 3 is a control circuit for use in combination with the circuit shown in FIG. 1 for maintaining the amplitude of the output of the circuit shown in FIG. 1 at a constant level independently of the intensity of light which is incident on the sensor elements.

A control arrangement is shown in FIG. 3 for holding the mean amplitude of the sensor signal $u_s$ constant independently of luminous intensity E which radiates the image sensor. The control circuit STS consists of a comparator 29, a backward counter 30 and a forward counter 31. The first input of the comparator 29 is connected to a reference voltage $V_R$ and its second input is connected to the output of a buffer amplifier 32 whose input is connected to a photodiode 33 which is biased in the blocking direction by means of a terminal 34 connected to the voltage $V_{DD}$. The junction of the buffer amplifier 32 and the photodiode 33 is connected to the reference potential of the circuit by two paths, a first path being via a capacitor C and a second path being via the switching segment of a transistor Tr. The output of the comparator 29 is connected to the S input of an RS flip-flop FF whose output Q is connected to the first input of an OR gate 35. The output of the OR gate 35 is connected to the gate of the transistor Tr. The second input of the OR gate 35 is connected to a terminal 36 at which the image-frequency pulses 37 occur which chronologically fall in the respective vertical blanking intervals VAL shown in FIG. 2. The terminal 36 is further connected to the R input of the flip-flop FF and is connected to the set input 40 of the counter 30 via a series connection of two inverters 38 and 39. The $\overline{Q}$ output of the flip-flop FF is connected to the enabling input 40a of the backward counter 30. The backward counter 30 can be set via an input 41 to the number of rows z of the image sensor. The counting input 42 of the backward counter 30 is connected to a terminal 43 at which row-frequency pulses 44 occur which respectively lie within the horizontal blanking intervals HAL1, etc. The counter reading of the backward counter 30 can be transmitted over lines 45 to an input 46 of the forward counter 31. The forward counter 31 has a counting input 47 which is also connected to the terminal 43. The output 48 for the counter carry of the forward counter 31 is connected via an inverter 49 to the first input 50 of an AND gate 50$a$ having an output 50$b$ which forms the output for the control circuit STS and at which the pulse $P_A$ appears. The output of the inverter 49 is also connected to the enabling input 51 of the forward counter 31. The second input of the AND gate 50$a$ is connected to a clock pulse generator 50$c$ which is triggered by the pulses 37 supplied to the input 36 so that the AND gate 50$a$ supplies the clock pulses $P_A$ beginning with the pulse 22, the pulses respectively occurring at the beginning of the blanking intervals HAL2, HAL4, etc. in the manner described in connection with FIG. 2.

The capacitor C is reset to the reference potential in every vertical blanking interval VAL by a pulse 37 which switches the transistor Tr to a conducting state. As a result of the exposure of the photodiode 33 with light rays 33$a$, which also expose the image sensor, a current which is proportional to the luminous intensity E on the photodiode 33 is generated which charges the capacitor C, so that a voltage is developed across the capacitor C. When the voltage across the capacitor C, which is supplied to one input of the comparator 29, reaches the value $V_R$ the comparator 29 switches states, that is, the output of the comparator 29 changes from a logical "0" to a logical "1". The time $t_u$ from the resetting of the capacitor C (that is, from the occurrence of a pulse 37) to the switching of the comparator 29 is defined by the equation:

$$t_u = c_4 \cdot (C \cdot V_R)/E = C_5/E$$

wherein $c_4$ and $c_5$ denote further constants. A comparison of the equation for $t_I$ with the above equation for $t_u$ shows that both those values are inversely proportional to the luminous intensity E. As soon as the comparator 29 emits a logical "1", the flip-flop FF is set, whereby the Q output switches from a logical "0" to a logical "1" which accordingly causes the transistor Tr to again briefly switch to a conducting state via the OR gate 35 and thus discharges the capacitor C. Simultaneously the enabling input 40$a$ of the backward counter 30, which was heretofore occupied with a logical "1", is now supplied with a logical "0" from the output $\overline{Q}$. Thus the backward counter 30, which had been previously set to the number z by the pulse 37 and had subsequently counted the incoming row-frequency pulses 44, is arrested. The counter reading $Z_{30}$ thereby reached in the backward counter 30 corresponds to the expression:

$$Z_{30} = z - \frac{t_I}{tz} = z - \frac{z - (2N - 1) \cdot tz}{tz} = 2N - 1$$

and thus corresponds to the reset time $t_R$. By means of a pulse 37 which is supplied to the set input 31$a$ of the forward counter 31, the counter reading reached by the backward counter 30 is transferred to the input 46 of the forward counter 31 at the beginning of the next vertical blanking interval VAL. Beginning from zero, the forward counter 31 then counts the incoming row-frequency pulses 44 until it has reached the same counter reading which was transferred from the backward counter 31, that is, $Z_{30}$. During this counting operation, the output 48, which is the carry output for the forward counter 31, is at a logical "0" so that the AND gate 50$a$ is enabled and the clock pulses $P_A$ beginning with the pulse 22, supplied by the clock pulse generator 50$c$ occur at the output 50$b$ of the control circuit STS. When the forward counter 31 reaches the counter reading $Z_{30}$ supplied thereto at the input 46, a logical "1" is emitted at the output 48 which, after inversion by the inverter 49, blocks the AND gate 50$a$ and also blocks the counter 31 via the input 51. The duration of the counting operation in the forward counter 31 corresponds to the reset time $t_R$. In the next vertical blanking interval VAL, the forward counter 31 is reset to zero by a pulse 37. Independently of the counting operation in the forward counter 31, the backward counter 30 also counts and determines the reset time for the next image duration BD2.

Figure 4:
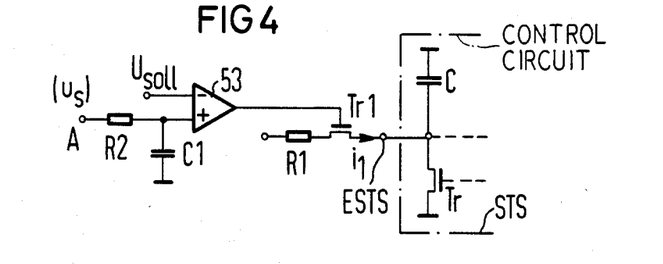
FIG. 4 is an additional circuit for use in combination with the circuits shown in FIG. 1 and FIG. 3.

A further embodiment for the circuit of FIG. 3 is shown in FIG. 4 wherein a regulation of the mean amplitude of the sensor signal $u_S$ to a rated value $U_{soll}$ can be achieved. To this end the input ESTS of the control circuit STS is connected via the source-drain segment of a transistor Tr1 and a high resistance resistor R1 to a terminal 52 which is supplied with the voltage $V_{DD}$. The resistor R1 permits the transistor Tr1 to function as a controllable current source with a high internal resistance. The gate of the transistor Tr1 is connected to the output of a differential amplifier 53 having a negative input which is supplied with the rated voltage $U_{soll}$ and having a positive input connected via a resistor R2 to the sensor output A. The positive input of the differential amplifier 53 is also connected to the reference potential for the circuit through a capacitor C1.

In the embodiment shown in FIG. 4, the sensor signal $u_S$ is averaged over the duration of a plurality of images by means of the low pass filter formed by C1 and R2. The averaged signal is compared to the rated voltage $U_{soll}$ in the differential amplifier 53, and the difference of the input signals supplied to that amplifier controls the output current $i_1$ of the transistor Tr1 functioning as a constant current source. Thus, the current $i_1$ replaces the current i shown in FIG. 3 from the photodiode 33. The control circuit STS then functions precisely as described above in connection with FIG. 3. In the embodiment shown in FIG. 4, the averaged value of $u_S$ is matched to the rated value $U_{soll}$ except for a repetitive error, so that a very precise control of the sensor signal is achieved.

Figure 5:
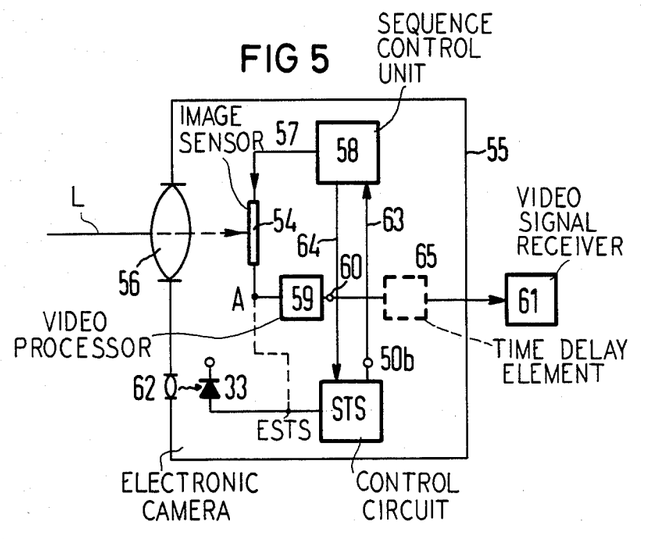
FIG. 5 is a schematic diagram of an electronic camera embodying a semiconductor image sensor constructed in accordance with the principles of the present invention.

The employment of a semiconductor image sensor constructed in accordance with the principles of the present invention in an electronic camera 55 is shown in FIG. 5. An image sensor of the type shown in FIG. 1 is used in the electronic camera 55 in the form of a monolithically integrated semiconductor arrangement 54. The camera 55 has a lens 56 for directing incident light L onto the image sensor 54. The required voltages and clock pulses are supplied to the image sensor 54 via lines 57 from a sequence control unit 58. The sensor output signals (appearing at the output A shown in FIG. 1) are supplied to a video processor 59 for processing into a video signal which is provided with horizontal and frame frequency pulses. The video signal proceeds via an output 60 to a video signal receiver 61, which may be a video recorder or a television set. In accordance with the control circuit embodiment shown in FIG. 3, a photodiode 33 which is illuminated by an auxiliary optics system 62 may precede the control circuit STS. Alternatively, the input ESTS may be connected to the output A of the image sensor 54 as explained in connection with FIG. 4, this being indicated in FIG. 5 by means of a dashed line. The pulses $P_A$ occurring at the output 50b are supplied over the line 63 to the sequence control unit 58 and from there to the image sensor 54. The pulses 37 and 34 (shown in FIG. 3) required for operating the control circuit STS are generated in the sequence control unit 58 and are transmitted over a line 64 to the control circuit STS. The electronic camera 55 may be a movie camera or a stationary image camera. If the electronic camera 55 is a stationary image camera, and if a control circuit STS for the sensor signals $u_s$ is employed, a time delay element 65 may be interconnected between the output 60 of the video processor 59 and the video signal receiver 61. The time delay element 65 enables forwarding of the video signals only when the searching for focusing the camera to a specific object has decayed. In the embodiment shown in FIG. 5, the control or regulation of the integration time of the sensor elements on the image sensor 54 replaces the hitherto standard exposure control in electronic cameras which conventionally utilizes mechanical or electromechanical means for aperture actuation and/or an exposure time control.

The image duration, such as BD1, may be set to a video norm of 20 ms, in which case the horizontal blanking intervals, such as HAL1, amount to 12 μs, the line duration, such as tz1, amounts to 64 μs, and the vertical blanking intervals, such as VAL1, amount to approximately 1.2 ms.

In place of the photodiodes such as D11 in the sensor array, CID sensor elements may be employed each of which consists of a pair of MIS capacitors disposed next to each other with the outer electrode of one capacitor of such a pair being connected to the row line and the outer electrode of the other capacitor in the pair being connected to the associated column line. An image sensor employing CID sensor elements is described in the article "Charge-Injection Imaging: Operating Techniques and Performances (sic) Characteristics," Burke et al, IEEE Journal of Solid State Circuits, Vol. SC-11, February 1976 at pages 121 through 128, particularly in FIGS. 1 and 2 of that article. For the purpose of cancelling the charges collected in the sensor elements during the reset time $t_R$, both the column lines and the associated row lines are simultaneously reset to the reference potential of the circuit.

Although modifications and changes may be suggested by those skilled in the art it is the intention of the inventors to embody within the patent warranted hereon all changes and modifications as reasonably and properly come within the scope of their contribution to the art.

We claim as our Invention:

1. A two-dimensional semiconductor image sensor comprising:
    a plurality of light-sensitive sensor elements for generating charge carriers in response to light incident thereon, said sensor elements disposed in rows and columns on a semiconductor substrate;
    a plurality of row lines respectively connecting all sensor elements in each of said rows;
    a plurality of column lines respectively connecting all sensor elements in each of said columns;
    a vertical shift register having a plurality of parallel outputs for sequentially selecting said rows of sensor elements for readout thereof over said column lines at a sensor output;
    a plurality of first row selection transistors respectively interconnected between one end of said row lines and a constant voltage, and each having a control electrode;
    a plurality of second row selection transistors respectively interconnected between said first row selection transistors and said parallel outputs of said vertical shift register, and each having a control electrode;
    a means for selecting said second row selection transistors such that the control electrodes of said first row selection transistors of all oddnumbered rows are connected to respective allocated parallel outputs of said vertical shift register in an alternating sequence with the control electrodes for said first row selection transistors for all even-numbered rows;
    a means for periodically connecting said column lines to said sensor output; and
    a means for periodically connecting said sensor output to a constant voltage,
    whereby all sensor elements in a row are selected for readout an additional plurality of times after an initial readout thereof, said additional readouts of said sensor elements occurring when said sensor output is connected to said constant voltage.

2. The two-dimensional semiconductor image sensor of claim 1 further comprising:
    a plurality of row reset transistors respectively interconnected between said rows and a reference potential for resetting said sensor elements in said rows.

3. The two-dimensional semiconductor image sensor of claim 1 wherein said means for periodically connecting said column lines to said sensor output comprises:
    a horizontal shift register having a plurality of parallel outputs;
    a column readout line connected to said sensor output; and
    a plurality of column selection transistors respectively interconnected between said column lines and said column readout line, and each having a control electrode connected to one of said parallel outputs of said horizontal shift register.

4. The two-dimensional semiconductor image sensor of claim 3 wherein said means for periodically connecting said column lines to said sensor output further comprises:
    a plurality of switching transistors interconnected between said control electrodes of said column selection transistors and a first sensor terminal, and each having a control electrode connected to a second sensor terminal,
    said first and second sensor terminals being respectively supplied with first and second clock pulse voltages for effecting a simultaneous readout of said columns of sensor elements at said sensor output when said sensor output is connected to a constant voltage.

5. The two-dimensional semiconductor image sensor of claim 1 wherein said means for periodically connecting said sensor output to a constant voltage includes a resistor interconnected between a constant voltage source and said sensor output.

6. The two-dimensional semiconductor image sensor of claim 5 wherein said means for periodically connecting said sensor output to a constant voltage further includes an output switching transistor having a switching segment connected in parallel with said resistor and having a control electrode connected to an output clock pulse voltage for periodically connecting said sensor output to said constant voltage source.

7. The two-dimensional semiconductor image sensor of claim 1 wherein said vertical shift register has a signal input and further comprising a control circuit having an output connected to said signal input for controlling operation of said vertical shift register, said control circuit comprising:
- a means for generating a control circuit input signal as a function of the luminous intensity of light incident on said image sensor;
- a comparator having a first input connected to a comparator reference potential and a second input connected to said means for generating a control circuit input signal;
- a capacitor interconnected between said second input of said comparator and ground;
- an RS flip-flop having a set input connected to the output of said comparator;
- a backward counter having an enabling input connected to the $\overline{Q}$ output of said RS flip-flop and a counting input, said backward counter being normally enabled and settable to a count equal to the number of rows of sensor elements;
- a forward counter having a carry output, an enabling output, and a counting input and being normally disenabled;
- an inverter connected to said carry output and having an output connected to said enabling input of said forward counter;
- said counting inputs of said forward and backward counters being connected to a row frequency clock pulse voltage;
- a means supplied with a transfer clock pulse voltage for periodically transferring the count of said backward counter to said forward counter;
- a means for resetting said capacitor when said RS flip-flop flips or when said count is transferred, whichever is earlier;
- a clock pulse generator triggered by said transfer clock pulse voltage; and
- an AND gate having a first input connected to the output of said inverter and a second input connected to an output of said clock pulse generator, and having an output forming said control circuit output, whereby said capacitor develops a voltage over time as a result of said input signal and said comparator sets said RS flip-flop when the voltage across said capacitor reaches said comparator reference potential, causing said RS flip-flop to flip thereby disenabling said binary counter after which the count of said binary counter is transferred to said forward counter which counts until reaching the count of said backward counter and which thereupon emits a signal at said carry output for permitting the output of said clock pulse generator to be conducted to said control circuit output and for simultaneously disenabling said forward counter.

8. The two-dimensional semiconductor image sensor of claim 7 wherein said means for resetting said capacitor comprises:
- an OR gate having a first input connected to the Q output of said RS flip-flop and a second input connected to said transfer clock pulse voltage; and
- a transistor having a switching segment interconnected across said capacitor and having a control electrode connected to the output of said OR gate.

9. The two-dimensional semiconductor image sensor of claim 7 wherein said means for generating a control circuit input signal comprises a photodiode interconnected between a constant voltage source and said second comparator input.

10. The two-dimensional semiconductor image sensor of claim 7 wherein said means for generating a control circuit input signal comprises:
- a differential amplifier having a first input connected to a voltage which is a mean sensor signal rated value, and having a second input;
- an RC filter interconnected between said second input of said differential amplifier and said sensor output; and
- a high resistance constant current source interconnected between the output of said differential amplifier and said second input of said comparator, the output current of said current source being controllable by said differential amplifier for charging said capacitor in accordance with the difference between the voltage at said sensor output and said rated value.

11. The two-dimensional semiconductor image sensor of claim 10 wherein said high resistance current source comprises:
- a resistor connected to a constant voltage source; and
- a transistor having a switching segment interconnected between said resistor and said second input of said comparator and having a control electrode connected to the output of said differential amplifier.

12. The two-dimensional semiconductor image sensor of claim 1 further comprising a video processor connected to said sensor output operating in combination with said image sensor as an electronic camera for generating a video signal.

13. A method for operating a two-dimensional semiconductor image sensor disposed in even-numbered rows and odd-numbered rows, and in a plurality of columns, and having a plurality of column lines respectively connecting all sensor elements in each column and a plurality of row lines respectively connecting all sensor elements in each row, comprising the steps of:
- sequentially selecting each of the even-numbered rows for readout of the charge carriers collected in the sensor elements in said even-numbered rows during a first readout over said column lines alternating with sequentially selecting each of the odd-numbered rows for a first readout over said column lines;
- periodically repeatedly reading out said sensor elements in said odd-numbered rows during said first readout of said even-numbered rows, and periodically repeatedly reading out said sensor elements in said even-numbered rows during said first readout of said odd-numbered rows;
- cancelling all charge carriers read out of said sensor elements during said readouts occurring after said first readouts of said odd and even numbered rows; and cyclically repeating the above steps after N cancellation of charge carriers.

14. The method of claim 13 wherein the step of repeatedly reading out said odd and even numbered rows after said first readout thereof is further defined by selecting each of said rows for readout by means of signals supplied to parallel outputs of a vertical shift register having a selected input signal and being supplied with clock pulse voltages, said input signal for said vertical shift register being a sequence of N pulses having a period which is twice the period of said clock pulse voltages.

15. The method of claim 13 comprising the additional step of:

selecting N as a function of the luminous intensity of the light which is incident on said two dimensional image sensor such that a mean amplitude of an output signal of said image sensor remains constant.

16. The method of claim 13 comprising the additional steps of:

determining the deviation of an output signal of said image sensor from a predetermined rated value; and selecting N such that said deviation is minimized.

17. The method of claim 13 comprising the additional steps of:

charging a capacitor by developing a voltage across said capacitor which is proportional to the luminous intensity of light incident on said image sensor;

simultaneously setting a backward counter with a count equal to the number of rows of sensor elements;

counting backward in said backward counter until said voltage across said capacitor reaches a predetermined value;

transferring the count in said backward counter into a forward counter as an upper count limit;

counting in said forward counter until reaching said upper count limit;

connecting a clock pulse generator to a signal input of a vertical shift register when said upper count limit is reached in said forward counter, said vertical shift register having a plurality of parallel outputs for initiating said N readouts of said sensor elements in said rows; and resetting said capacitor to a reference potential.

* * * * *